(12) United States Patent
Pan et al.

(10) Patent No.: US 10,894,846 B2
(45) Date of Patent: *Jan. 19, 2021

(54) REDOX STIMULATED VARIABLE-MODULUS MATERIAL

(71) Applicant: UNIVERSITY OF PITTSBURGH—OF THE COMMONWEALTH SYSTEM OF HIGHER EDUCATION, Pittsburgh, PA (US)

(72) Inventors: Tianqi Pan, Shenyang (CN); Tara Yvonne Meyer, Pittsburgh, PA (US); William W. Clark, Wexford, PA (US); David Waldeck, Pittsburgh, PA (US); Lisa Mauck Weiland, Pittsburgh, PA (US); Percy Calvo-Marzal, San Antonio, TX (US); Rachel D. Harris, Shorewood, WI (US); Haitao Liu, Pittsburgh, PA (US)

(73) Assignee: University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 520 days.

This patent is subject to a terminal disclaimer.

(21) Appl. No.: 15/368,254

(22) Filed: Dec. 2, 2016

(65) Prior Publication Data

US 2017/0081448 A1 Mar. 23, 2017
US 2020/0040116 A9 Feb. 6, 2020

Related U.S. Application Data

(62) Division of application No. 13/710,114, filed on Dec. 10, 2012, now Pat. No. 9,944,729.

(60) Provisional application No. 61/568,835, filed on Dec. 9, 2011.

(51) Int. Cl.

| C08F 28/02 | (2006.01) |
|---|---|
| C08F 26/06 | (2006.01) |
| C08F 212/14 | (2006.01) |
| C08F 220/06 | (2006.01) |
| C08J 3/075 | (2006.01) |
| C08J 3/24 | (2006.01) |
| H01B 1/24 | (2006.01) |

(52) U.S. Cl.
CPC .............. C08F 28/02 (2013.01); C08F 26/06 (2013.01); C08F 212/14 (2013.01); C08F 220/06 (2013.01); C08J 3/075 (2013.01); C08J 3/24 (2013.01); H01B 1/24 (2013.01); *C08J 2333/02* (2013.01)

(58) Field of Classification Search
CPC .. C08F 28/02; C08F 26/06; C08F 6/00; C08F 212/14; C08F 220/06; C08F 212/30; C08J 3/075; C08J 3/24; C08J 2333/02; H01B 1/24
USPC ...... 252/511, 519.21, 519.1, 519.33, 519.34, 252/506; 528/480
See application file for complete search history.

(56) References Cited

U.S. PATENT DOCUMENTS

| 4,882,399 | A | * | 11/1989 | Tesoro | ................... | C08G 59/18 |
|---|---|---|---|---|---|---|
| | | | | | | 525/523 |
| 6,825,061 | B2 | * | 11/2004 | Hokari | ............... | H01L 51/0007 |
| | | | | | | 257/103 |
| 7,345,301 | B2 | * | 3/2008 | Gerhard | ............... | C07C 49/223 |
| | | | | | | 252/301.16 |
| 7,659,010 | B2 | * | 2/2010 | Burn | ................... | C07F 15/0033 |
| | | | | | | 257/E51.044 |
| 9,944,729 | B2 | * | 4/2018 | Meyer | ..................... | C08F 28/02 |
| 2001/0014731 | A1 | * | 8/2001 | Gaub | ................... | C08G 61/122 |
| | | | | | | 528/480 |
| 2006/0054866 | A1 | * | 3/2006 | Ait-Haddou | ........... | B82Y 30/00 |
| | | | | | | 252/378 R |
| 2006/0280799 | A1 | * | 12/2006 | Tirelli | .................. | A61K 9/5089 |
| | | | | | | 424/489 |
| 2007/0269488 | A1 | * | 11/2007 | Ravi | ..................... | A61K 9/0048 |
| | | | | | | 424/429 |
| 2013/0123435 | A1 | * | 5/2013 | Okuda | ....................... | B07B 1/54 |
| | | | | | | 525/384 |

OTHER PUBLICATIONS

Shigeo Sasaki et al., "Mechanical Oscillation Coupled with the Belousov-Zhabatinsky Reaction in Gel", Langmuir, 2003, 19, 5595-5600. (Year: 2003).*
Mark A. Hempenius et al., "Synthesis of Poly(ferrocenylsilane) Polyelectrolyte Hydrogels with Redox Controlled Swelling", Macromolecules, 2009, 42, 2324-2326. (Year: 2009).*
Shih-To Fei et al., "A redox responsive polymeric gel based on ionic crosslinking", Soft Matter, 2006, 2, 397-401. (Year: 2006).*
Percy Calvo-Marzal et al., "Manipulating Mechanical Properties with Electricity: Electroplastic Elastomer Hydrogels", ACS Macro Letters, 2012, 1, 204-208. (Year: 2012).*

* cited by examiner

Primary Examiner — Douglas J McGinty
(74) Attorney, Agent, or Firm — Paul D. Bangor, Jr., Esquire; Clark Hill, PLC

(57) ABSTRACT

A material having a first non-zero elastic modulus capable of reversibly changing the first non-zero elastic modulus to a second non-zero elastic modulus in response to a redox reaction occurring in the material. A method of producing a material that is reversibly cyclable between a first non-zero elastic modulus and a second non-zero elastic modulus, comprising: preparing a polymer comprising both crosslinks that do not depend on metal binding and functional groups capable of having oxidation-state specific binding constants to a metal ion; and doping the polymer with a solution containing the metal ion.

8 Claims, 3 Drawing Sheets

REDOX STIMULATED VARIABLE-MODULUS MATERIAL

RELATED APPLICATION

The present application is a DIVISIONAL of copending U.S. patent application Ser. No. 13/710,114 entitled "REDOX STIMULATED VARIABLE-MODULUS MATERIAL" and filed Dec. 10, 2012, the entirety of which is incorporated herein by reference for all purposes. This application claims priority benefit under 35 U.S.C. § 119(e) of U.S. Provisional Application No. 61/568,835, filed Dec. 9, 2011.

GOVERNMENTAL RIGHTS

This invention was made with government support under Grant No. CHE0906980 awarded by the National Science Foundation (NSF). The government has certain rights in the invention.

BACKGROUND

A need exists for materials whose properties can be adjusted on-demand without requiring a change in the overall environment of the material. In the domain of "smart materials," a wide variety of materials exist that exhibit response to stimulus, including piezoelectric (which produce electrical field and charge in response to applied stress or conversely undergo strain in response to applied electric field), magnetostrictive and electrostrictive (which exhibit strain in response to magnetic or electric field), electroactive polymers (which exhibit strain/swelling in response to application of electric charge), shape memory polymers and alloys (which exhibit strain in response to thermal or magnetic stimulus) and light-activated shape memory polymers (which exhibit strain in response to light stimulus). In each of these materials, the primary effect is change in dimension and observable change in modulus is a secondary (and minor) effect.

Material properties can be dramatically changed with chemical inputs, including pH, counterion identity and concentration, and chemospecific host/guest interactions. Responses observed include phase transitions, changes in coordination or hydrogen bonding, electrostatic repulsions/attractions, swelling/deswelling and conformational changes. A wide variety of photo-crosslinking materials are currently available and are used in applications such as photoresists for microfabrication. While these materials do exhibit substantial change in mechanical properties, the reactions are not generally reversible and/or require the addition/removal of chemical reagents. Reversability is a desired property. The addition/removal of chemical agents is an undesirable requirement.

Electro- and magneto-rheological (ER and MR) fluids are known for their reversible changes in viscosity due to applied electrical or magnetic field, however the effects disappear when the stimulus is removed, and they do not affect the elastic properties of the material. Magnetorheological elastomers are a derivative of MR fluids in which the magnetic materials are bound in an elastomeric medium so that application of magnetic field changes the elastic properties of the composite structure. The stimulus is magnetic (not electrical) and it does not exhibit a power-off hold state. That is, when the magnetic field is removed, the material reverts to its base (soft) state.

Polyelectrolyte-based hydrogels (electroactive polymers, EAPs), have the ability to behave as artificial muscles which bend directionally when a potential gradient is applied. The "bending" behavior is driven by ion migration and osmotic pressure and can, therefore, occur only during the actual application of electrical energy.

Another desired property is the maintenance of a three-dimensional shape in all states. Electrically-stimulated polymeric materials that exhibit mechanical property changes other than osmotically-controlled mechanical actuation are generally stimulated either as cast films (not macroscopic in all dimensions), or they undergo a transformation between sol and gel states (shape is neither controlled nor maintained).

Forming and breaking polymer chain crosslinks can change bulk mechanical properties. However, few of these materials are reversible and of those that are, all have stimulus-defined limitations. For example, many systems are not self-contained—they require manual addition and removal of solvents or chemicals for each response. Other systems are stimulated by temperature which is difficult to direct to a specific location in the material. Moreover, the required activation temperatures could prove impractical to access and/or implement for specific applications.

The fundamental redox properties and complexation differences of iron and copper in multiple oxidation states have been reported to introduce crosslinks into linear polymers. These systems are soluble liquids in one oxidation state and dimensionally undefined gels formed by kinetic precipitation in the other. Example systems have demonstrated that either electrochemistry or light can be used in the $Fe^{2+}/Fe^{3+}$ redox couple to induce a sol-gel transition in poly(acrylic acid).

Polyelectrolytes systems can be chemically or electrochemically switched between two states by exploiting redox sensitive couples such ferrocene/ferrocenyl and $Fe(CN)_6^{4-}/Fe(CN)_6^{3-}$. The observed swelling/deswelling and aggregation/deaggregation behaviors of these systems originate from the differences in intra- and interchain electrostatic interactions caused by the change in overall charge on the metal complexes rather than by changes of coordination at the metal center.

While modulus change is inherent in the materials listed above, it is not the primary feature of many of the materials. For example, the shape memory materials have an inherent transition temperature (or magnetic field), which if exceeded, the material will rearrange its structure, thereby undergoing substantial strain (up to 8% for alloys and up to 100% for polymers). There is an accompanying change in elastic modulus (which depends on loading conditions and may be 2-3 times for alloys and orders of magnitude for polymers). The fact that the modulus change cannot be controlled independently of the dimensional change makes it impractical as a useful feature, except in very limited applications. The modulus change has been used more extensively in shape memory polymers than in alloys, partly because it is more pronounced in the polymers, but more importantly because the stresses that can be supported by the polymers are much lower than in the alloys, so if constrained the modulus change is the more dominant effect. For both of these systems, though, the more limiting factor is the thermal stimulus, which is difficult to control spatially, results in a very slow response time for material transition, and has no ability to hold the materials in the soft modulus with no power (note that for magnetic shape memory alloys, the response time is much faster, but the lack of power-off hold is still problematic as is the geometric issue of applying the stimulus).

SUMMARY

A first preferred aspect of the present application is a material having a first non-zero elastic modulus capable of reversibly changing the first non-zero elastic modulus to a second non-zero elastic modulus in response to a redox reaction occurring in the material. In a preferred embodiment the redox reaction is caused by an electric potential applied across the material or by exposing the material to an oxidant or reductant. In a preferred embodiment the first non-zero elastic modulus or second non-zero elastic modulus is maintained by the material after abatement of the redox reaction. In a preferred embodiment the material, in-whole or in-part, may reversibly change from substantially the first non-zero elastic modulus to substantially the second non-zero elastic modulus and vice versa upon successive redox reactions occurring in the material, in-whole or in-part. In a preferred embodiment the material has a minimum elastic modulus and a maximum elastic modulus, wherein each of the first non-zero elastic modulus and the second non-zero elastic modulus may consist of a value at the minimum elastic modulus, the maximum elastic modulus or a value therebetween wherein the first non-zero elastic modulus is greater than the second non-zero elastic modulus or the first non-zero elastic modulus is less than the second non-zero elastic modulus. In a preferred embodiment the material defines a first shape while the material has the first non-zero elastic modulus which is less than the second non-zero elastic modulus, wherein the first shape may be deformed to define a second shape and wherein the second shape is maintained after application to the material of a redox reaction and wherein the material attains the second non-zero elastic modulus. In a preferred embodiment the material is a component of a composite structure.

A second preferred aspect of the present application is a material reversibly cyclable between a first non-zero elastic modulus and a second non-zero elastic modulus comprising one or more metal ions and a polymer having both crosslinks that do not depend on metal binding and functional groups that have oxidation-state specific binding constants to the metal ions. In a preferred embodiment the metal ions consist of only one element. In a preferred embodiment the metal ions consist of at least two different elements and the polymer has both crosslinks that do not depend on metal binding and functional groups that have oxidation-state specific binding constants to each element. In a preferred embodiment the polymer contains one or more functional groups selected from the group consisting of: carboxylate, carboxylic acid, amide, sulfide, thiol, alkoxide, alcohol, phosphine, amine, amide, halogen, sulfonic acid, sulfonate, phosphonate and phosphonic acid; wherein the one or more functional groups bind to the metal ions. In a preferred embodiment the one or more metal ions are selected from the group consisting of: iron (II/III), copper (I/II), cobalt (II/III), palladium (0/II), silver (I/II), manganese (II,III,IV), nickel (0,II), ruthenium (II/III), rhodium (I/II/III), platinum (MI) and gold (0/I/II). In a preferred embodiment the polymer comprises monomer residues from monomers having the structure $H_2C=CR^1R^2$, where $R^1$ and $R^2$ are independently selected from the group consisting of —H, (C1-C8)alkyl, phenyl, aryl, heteroaryl, pyridinyl, pyrrolyl, thiophenyl, —C(=O)OR$^3$, —C(=O)NR$^3$R$^4$, —C(=NR$^3$)OR$^4$ and —CH=CR$^3$R$^4$, where $R^3$ and $R^4$ are independently selected from the group consisting of —H, (C1-C8)alkyl, phenyl, aryl, heteroaryl, pyridinyl, pyrrolyl and thiophenyl. In a preferred embodiment the polymer is a hydrogel and comprises at least one monomer residue selected from the group consisting of: 4-vinylpyridine, acrylate, styrene sulfonate and polyethylene glycol diacrylate. In a preferred embodiment the one or more metal ions is selected from the group consisting of copper (I/II) and iron (II/III). In a preferred embodiment the polymer further comprises a least one conductive additive selected from the group consisting of: carbon nanotubes, chemically modified carbon nanotubes, graphene, partially-reduced graphene oxide, chemically modified graphene, conducting polymers and nanoparticles.

A third preferred aspect of the present application is a method of producing a material that is reversibly cyclable between a first non-zero elastic modulus and a second non-zero elastic modulus, comprising: preparing a polymer comprising both crosslinks that do not depend on metal binding and functional groups capable of having oxidation-state specific binding constants to a metal ion; and doping the polymer with a solution containing the metal ion. In a preferred embodiment the method further comprises reversibly cycling between a first non-zero elastic modulus and a second non-zero elastic modulus by altering the oxidation state of the metal ion by a redox reaction or a redox stimulus. In a preferred embodiment the solution further comprises at least one ligand with functional groups capable of binding to the metal ion, wherein the functional groups are selected from the group consisting of: carboxylate, carboxylic acid, amide, sulfide, thiol, alkoxide, alcohol, phosphine, amine, amide, halogen, sulfonic acid, sulfonate, phosphonate and. In a preferred embodiment the solution comprises a copper salt and urea. In a preferred embodiment the solution comprises an iron salt and citric acid. In a preferred embodiment the iron salt is $FeCl_2$ or $FeCl_3$. In a preferred embodiment the polymer is a cross-linked hydrogel made by a first step of polymerizing an aqueous solution comprising sodium acrylate, sodium sulfonate, and polyethylene glycol diacrylate with ammonium persulfate. In a preferred embodiment the redox stimulus is delivered by application of an electric potential across the material.

DETAILED DESCRIPTION

It is to be understood that the descriptions of the present disclosure have been simplified to illustrate elements that are relevant for a clear understanding of the present disclosure, while eliminating, for purposes of clarity, other elements that may be well known. Those of ordinary skill in the art will recognize that other elements are desirable and/or required in order to implement the present disclosure. However, because such elements are well known in the art, and because they do not facilitate a better understanding of the present disclosure, a discussion of such elements is not provided herein. Additionally, it is to be understood that the present disclosure is not limited to the embodiments described above, but encompasses any and all embodiments within the scope of the description and the following claims.

Definitions

The following definitions apply to the terms as used throughout this specification, unless otherwise limited in specific instances.

As used herein, the term "modulus" is defined as the slope of its stress-strain curve in the elastic deformation region. As such, a stiffer material will have a higher elastic modulus.

As used herein, the term "redox" is defined as reduction-oxidation reactions and include all chemical reactions in which atoms have their oxidation state changed As used herein, the term "oxidation" is the loss of electrons or an increase in oxidation state by a molecule, atom, or ion.

As used herein, the term "reduction" is the gain of electrons or a decrease in oxidation state by a molecule, atom, or ion.

As used herein, the term "metal ion" includes metals atoms in the zero, +1, +2, +3, or +4 oxidation state.

As used herein, the term "permanent" when used to describe polymeric cross-links means cross-links of a covalent nature that are not readily cleavable, i.e., cross-links formed by one or a series of covalent bonds, such as covalent single bonds, covalent double bonds and covalent triple bonds

DESCRIPTION

Figure 1:
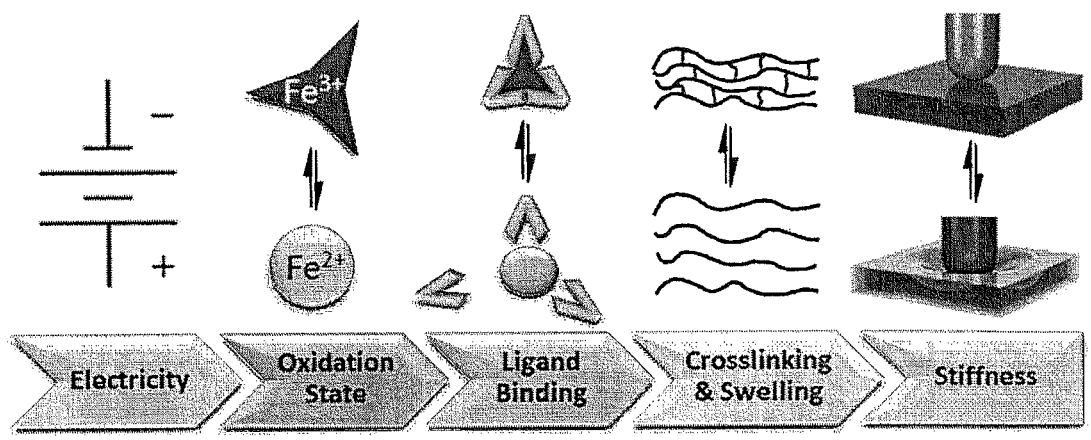
FIG. 1. Electroplastic elastomer mechanism. Multi-step pathway that reversibly converts electricity to a change in bulk stiffness in iron-crosslinked electroplastic elastomer hydrogels.

The present specification describes the creation of a new material that uses electricity or a change in oxidation state as a stimulus to produce, reversibly, a change in bulk-scale stiffness as a response (see FIG. 1). This novel class of materials is known as electroplastic elastomer hydrogels (hereinafter "EPEHs"). EPEHs represent the first of a novel class of materials that act in a self-contained system to change mechanical properties with electrical stimulus or change in oxidation state. The EPEH materials are created with defined dimensions and while there may be a change in volume due to differences in water swelling, the dimensions remain well-defined rather than going through a liquid state. The availability of materials of this type spawn new design paradigms that in turn lead to innovations in aerospace, manufacturing, consumer products, robotics, etc.

Although the creation of materials that respond to external stimuli is one of the most active frontiers of current materials development, EPEHs display a unique and valuable combination of properties not found in any other system: 1) reversible changes in mechanical stiffness which can be achieved using either electrical input or change in oxidation state and 2) 3D-macroscale dimensions in all states. Electricity, which is employed as one of the stimuli for EPEHs, satisfies these requirements and offers practical advantages including ease of access, portability, and a sophisticated technology infrastructure.

EPEHs maintain a three-dimensional shape in all states, which is a property not shared by other electrically reversible systems. EPEHs are not limited to, but can have macroscopic dimensions in all directions and maintain a non-zero stiffness in all states that enables shape to be retained while compliance is tuned.

The $Fe^{2+}/Fe^{3+}$ redox couple and the $Cu^+/Cu^{2+}$ redox couple were utilized for developing the EPEHs of the present specification because these systems are both well-behaved and well-understood; these ion pairs can be interconverted in a convenient electrical potential window. As iron or copper ions in different oxidation states have distinct coordination preferences—$Fe^{3+}$ binds more strongly than $Fe^{2+}$ to "hard" ligands—the change in oxidation state can be used to control the degree of crosslinking in a polymer bearing hard carboxylate side-groups. Given the known correlation between crosslink density and the stiffness of polymeric materials, it follows that the mechanical properties of the bulk material should be reversibly controlled by the interconversion of $Fe^{2+}$ and $Fe^{3+}$, or $Cu^+$ and $Cu^{2+}$ Samples prepared independently with comparable $Fe^{2+}$ and $Fe^{3+}$ ion contents (Table 1, ca. 1.2 mmol/cm$^3$) exhibited more than an order of magnitude difference in modulus when subjected to mechanical testing using an indentation methodology. Compressive moduli of 0.06 and 2.1 MPa were measured for $Fe^{2+}$ and $Fe^{3+}$ samples, respectively, that were prepared, measured, and analyzed for iron content using identical protocols. Moduli higher than 2.1 MPa can be achieved for $Fe^{3+}$ samples by adjustments in doping conditions.

Figure 2:
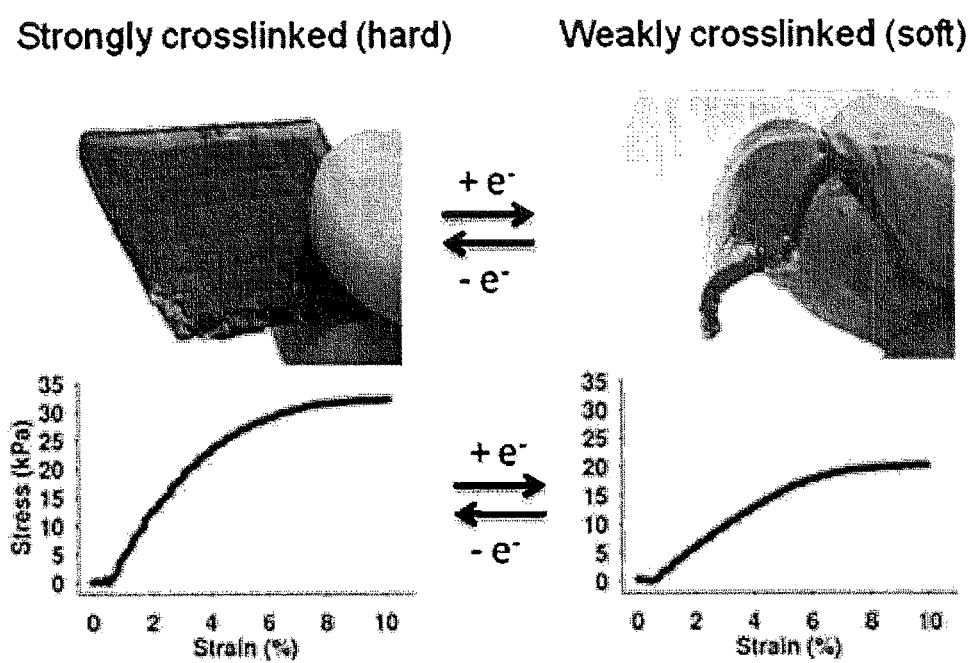
FIG. 2. Redox-mediated switching between second non-zero elastic modulus and first non-zero elastic modulus states for iron-based electroplastic elastomer. Reversible electrochemical conversion of second non-zero elastic modulus $Fe^{3+}$-crosslinked hydrogel (left) to first non-zero elastic modulus $Fe^{2+}$ hydrogel (right). Hydrogel in oxidized (left) and reduced (right) states held in gloved hand. (Bottom) Mechanical stress/strain curves for EPEHs in the oxidized and reduced states under compressions.

The mechanical properties of the EPEH samples are controlled by the electrolytic interconversion of the $Fe^{3+}$ and $Fe^{2+}$ within the same bulk sample. An EPEH sample of standard dimensions was prepared directly on a glassy carbon electrode. After in-situ $Fe^{3+}$ exchange the sample was protected from exposure to light and subjected to a reducing potential of −0.8 V for 18 hours in an electrolyte solution of 0.5 M citric acid and 2.0 M $FeCl_2$. The sample became softer to the touch, pale orange-yellow in color, and was visibly swollen relative to the initial state (FIG. 2—top right). Exchange of the tightly bound $Fe^{3+}$ with the $Fe^{2+}$ present in the electrolyte solution (necessary for the reduction step in samples that will be cycled between states, vide infra) is not significant—a control submerged for the same period in the same solution without electrolysis, did not soften nor change color. It is important to note that the reduction occurs analogously when the electrolyte solution comprises only $KNO_3$ (0.2 M, pH 1). Also, leaching of hydrogel-bound $Fe^{3+}$ into the electrolyte solution is negligible under these conditions. Mössbauer analysis of both the starting sample and the sample produced by reduction established unambiguously that a nearly complete conversion of the high-spin $Fe^{3+}$ in the sample to high-spin $Fe^{2+}$ occurred. Air oxidation during Mössbauer sample preparation and/or incomplete reduction is responsible for the small $Fe^{3+}$ shoulder (<15%). The sample color for the reduced EPEH, which is orange-yellow rather than the yellow-green that is characteristic of freshly prepared $Fe^{2+}$-doped hydrogels, is likewise consistent with the presence of a small fraction of the more intensely colored $Fe^{3+}$ crosslinks.

Oxidation of a freshly prepared $Fe^{2+}$ EPEH in 2 M $FeCl_2$, 0.5 M citric acid produced the opposite changes in color and mechanical properties. After oxidation at 1.2 V for a period of 14 hours (light excluded, $N_2$ atmosphere), the sample became darker orange in color, thinner, and stiffer (FIG. 2—top left); grid pattern caused by macroporous pressure cap). The presence of $FeCl_2$ in the electrolyte facilitates the oxidation step because, as per the design of the system, $Fe^{2+}$ is weakly bound and will, therefore, rapidly equilibrate with the external solution. (FIG. 2—bottom) shows stress strain curves that were acquired by indentation testing of electrode-mounted samples after oxidation (left) and reduction (right). Chemical oxidation of $Fe^{2+}$ samples by treatment with ammonium persulfate gave analogous physical and optical changes. EPEHs with $Fe^{2+}$ crosslinks also slowly oxidize in air over the course of hours to days, as shown by changes in color and stiffness of samples stored in humid environments to prevent drying.

The oxidation/reduction is reversible. The compressive moduli for a single EPEH sample that was subjected to two cycles of reduction and oxidation switch reversibly between ca. 1.0 MPa and 0.6 MPa. At each stage the samples displayed the color profile and degree of swelling that is characteristic of the particular oxidation state. Although the changes are reproducible and the moduli are clearly distinct, the difference in modulus range is smaller than that observed for samples directly prepared from $Fe^{2+}$ and $Fe^{3+}$. While not intending to be limited by any theory, we attribute the differences to a combination of two factors: 1) iron equilibration between the sample and electrolyte under experimental conditions and 2) air oxidation of reduced samples during sample transport and mechanical measurement.

Chronoamperometry and chronocoulometry establish that the redox process for sample of dimensions 2.5×2.5×0.2 cm requires >14 h. It should be noted that the total charge passed is much greater for the oxidation process because of the presence in the electrolyte solution of excess $Fe^{2+}$, which is maintained in constant excess within the system—not added or removed—for both the oxidation and reduction cycles.

EPEHs manifest a combination of features that suggest that they have an exceptional potential for further development and applications: scalability, reversibility, stability, tunability, and effective delivery of the stimulus.

Scalability is a key characteristic of the EPEH materials. Many intriguing nano- and subnanoscale phenomena have not successfully been translated into macroscale responses. By employing Nature's tactic of using multiple mediating steps it has been possible to translate an atomic scale phenomenon, metal-ion redox transformation, to a mechanical response that is readily observable on a macroscale. The hydrogels are prepared from non-exotic reagents and the same basic procedure is applicable to samples on larger scales—we have prepared samples with thicknesses up to 2.5 cm and length×width dimensions>100 $cm^2$.

Reversibility and stability of the different states are features of the EPEHs. The redox process cycles the metals between two states that are stable as long as the material is protected from environmental oxidants and reductants. The electrical power used to switch states is not necessary to maintain them. There is also no theoretical limit on the number of times that the electrochemical process can be repeated. An aqueous $Fe^{2+}$ reservoir is a component for the cycling as the uptake and exclusion of water and ions in the hydrogel is integral to the manifestation of oxidation-state dependent mechanical properties.

EPEHs are highly tunable both in their preparation and in their implementation. By varying the percentage of carboxylate monomers or PEG-DA crosslinking agent relative to the other components, the fundamental stiffness can be adjusted within the limits of maintaining sample integrity and hindering ion migration. There is also the potential to adjust the stiffness through a full continuum of values within its range by partial redox.

EPEH samples prepared with the addition of 1-3% vinyl-functionalized multi-walled carbon nanotubes (MWNTs) or graphene oxide were doped with iron and then subjected to reducing conditions. The time to pass 40 Coulombs decreased from 11.9 h for hydrogel with no nanotubes to 3.2 h for 3%-MWNTs. Qualitative examination of the hydrogel color and behavior is consistent with a significant decrease in time for iron reduction.

Use of Carbon Nanotubes for Improving Conductivity and Response Time:

To improve response time for electrochemical redox conductive elements, for example, carbon nanotubes, chemically modified carbon nanotubes, graphene, partially-reduced graphene oxide, chemically modified graphene, conducting polymers and metal nanoparticles, can be added to the hydrogel. These conductive elements will decrease the diffusion distance for the metal and reinforce the material.

Use of Copper as the Binding Metal:

The mechanical properties of EPEHs, and therefore, their potential for application depends on their exact formulation. A new electroplastic elastomer hydrogel has now been prepared that uses the different coordinative abilities of the $Cu^+/Cu^{2+}$ pair to control material stiffness; $Fe^{2+}/Fe^{3+}$ was used previously. The polyelectrolyte backbone of the new hydrogel bears new ligands which are more suited to copper binding, in place of the iron-binding ligands used in the first formulation. After doping with $Cu^{2+}$, the dark-blue hydrogels, which are much stiffer and tougher than the $Fe^{3+}$ gels, can be reduced electrochemically to give a light-green $Cu^+$ hydrogel that is very flexible. These new copper-based hydrogels will have application where a tougher, more elastic interface is needed.

Prosthetics and Orthotics Applications:

Potential applications for variable modulus materials are widespread and include such areas as robotics, aerospace structures, adaptive optics and medical devices. The range of moduli and the ability to tune the modulus through a continuum of values as a function of stimulus make them suitable for potential uses in orthotics and prosthetics in which they serve as customizable interfaces between the relatively soft exterior of the human body and more rigid protective or prosthetic gear. These materials provide an ability to customize fit and to adjust the stiffness of the material as often as needed to increase comfort and/or improve function.

Although there have been significant technological leaps in the design and function of prosthetics, the interface with the human body remains a weak point. EPEHs may allow the user to control and customize the fit to respond to changes in their bodies (e.g. swelling, weight loss), environment (e.g. temperature, humidity) or task (e.g. normal daily activity vs running a 10 K race). Another specific medical application is orthotics for the prevention of pressure ulcers. For example, diabetic foot ulcers alone make up a large medical problem, with estimates of up to 25% of the estimated 20 million people with diabetes in the US expected to develop a diabetic foot ulcer within their lifetimes. The EPEH material in this invention may be used to develop orthotics which are locally tunable for adaptive treatment of such ulcers. Pressure ulcers also originate in many other instances such as the use of prosthetics and wheel-chairs, and bed-ridden patients.

The electrically-activated materials lead to flexible, tunable materials suitable for application in the prevention of ulcers in the diabetic foot. Diabetes is already a major health concern, and still rapidly growing, that in many cases exhibits a well understood path of neuropathy in the foot, to pressure ulcers, to amputation, and ultimately to premature death. Foot ulcers may be prevented by electrically tuning an insole device's stiffness to reduce high stress areas thereby preventing the onset of life-threatening conditions that often evolve from diabetic foot ulcers.

The hydrogel material maintains its structural integrity during the transition but deforms easily under stress such that it can serve as a "cushion" for example between the relatively soft tissue of the human body and harder surfaces. The working range of moduli is tunable by changing the chemical composition of the material and lies in the kPa to GPa region, which is ideal for this class of application. Because the modulus change can be addressed spatially using independent EPEH cells, an adjustable interface between a foot and an insole, for example, could be produced, with softer areas seeing reduced stress and harder areas carrying more stress. The synthetic process is facile and can yield samples of virtually any dimensions. The EPEH system involves the electro-adaptive hydrogel, electrodes, and an electrolyte solution that provides a reservoir of ions that enable the red-ox reactions. These components may be contained in a set-up conducive to laboratory bench testing.

Array and/or Multi-Layer Cells:

Arrays and/or layers of multiple EPEH cells or units may be used to achieve spatially addressable structures of sufficient thickness to accommodate the expected deformations, but thin enough to achieve the needed electron and ion transport. EPEH units may be in many different shapes including cylindrical, hollow tube, prismatic, strand, layer, and multiple units may be combined in two or three-dimensional arrays, rows, columns, layered, woven, or braided arrangements to create an article. Alternatively, articles can be made of a single quantity of EPEH material in many different shapes.

Development of Cell "Skin":

A skin material may be developed that serves the dual purpose of containment of the electrolyte reservoir and interface to an adjacent surface. The skin enables the EPEH material to maintain a pliable interface to an adjacent surface in the face of thermal, moisture, and shear stress issues.

The most important elements of diabetic foot ulcer (DFU) prevention strategies are the appropriate use and design of footwear. Current best practices for prevention include the design of custom fit shoes with molded inserts designed to minimize the harmful pressures that go undetected by the person with neuropathy in their feet. The high incidence and prevalence of DFUs provide clear evidence that these strategies are woefully inadequate. Part of the problem can be attributed to low compliance with footwear interventions. A study on compliance to diabetic footwear interventions showed that only 42% of the people followed wore their shoes long enough to reach the daily effectiveness threshold of 60%. Indoors, where many people spend most of their time, the compliance was worse—only 30%.

However, the root cause of the problem is poor fitting footwear that does not redistribute pressure well under changing conditions. The state of the art customization procedures that are practiced today typically use an interface pressure distribution measurement made under static standing conditions on a rigid flat surface to design a custom shaped orthotic supporting surface. The resulting orthotic does not and cannot account for changing load distributions with gait or changes resulting from swelling. Optimization of the load distribution is a daunting task with the currently available materials and knowledge. While it is possible to measure interface pressure dynamically during gait, it is difficult and impractical to iteratively alter support surface shape and/or stiffness to provide an optimum solution.

An EPEH and control system embedded in either a sock or insole that allows for rapid optimization by manipulating stiffness and redistributing pressure in the foot can be prepared. The smart orthotic footpad may comprise an array of up to a few thousand electrode elements and will have an overall thickness between 1 and 10 mm. The device then will comprise an array of independently addressable areas whose stiffness can be adjusted.

EXPERIMENTALS

Typical Hydrogel Preparation for Iron Articles:

EPEH samples were prepared by simple free-radical copolymerization of commercially purchased monomers under standard conditions. Sodium acrylate, sodium (4-styrene sulfonate), and polyethylene glycol diacrylate (PEG-DA, $M_n$=575) in a weight ratio of 12:8:1 were reacted in aqueous solution with an ammonium persulfate catalyst at 85° C. for 1.5 hours to give a soft, colorless hydrogel. The presence of the permanent PEG-DA crosslinks gives the hydrogels a baseline shape defined by the reaction vessel. Adjustments in PEG-DA stoichiometry relative to the other monomers produced hydrogels that were qualitatively stiffer (increased PEG-DA) or softer (decreased PEG-DA).

Iron Doping:

Cation exchange of sodium ions for $Fe^{2+}$ or $Fe^{3+}$ was accomplished by submersion of the hydrogel in a solution of 2.0 M $FeCl_2$ or $FeCl_3$ and 0.5 M citric acid for a period of 20-48 hours. Exchange with $Fe^{2+}$ produced samples that were pale yellow-green in color and slightly smaller than the original hydrogel, due to coordinative crosslinking. Samples prepared with $Fe^{3+}$ were orange-red and even more contracted in dimension—up to 50% smaller in thickness than the pre-doped samples. Hydrogels were transparent and appeared homogeneous throughout. Although the standard samples prepared for this article are relatively small, 2.5× 2.5×0.2 cm after doping with $Fe^{3+}$, the procedure is inherently scalable to nearly any sample size.

Depending on the dimensions of the sample being prepared, 2 to 8 mL of the reaction mixture was pipetted into a mold. For electrochemical experiments the mold for the sample was created by temporarily affixing, using Poly (dimethylsiloxane) (PDMS) adhesive, a square glass cell to a Teflon base bearing a freshly polished glassy carbon electrode (GCE). The mold/sample combination was then heated at 85° C. for 1.5 h. After cooling to RT, the hydrogel was doped by simple submersion in either a solution of 2.0 M $FeCl_2$/0.5 M citric acid or 2.0 M $FeCl_3$/0.5 M citric acid for a period of 20-48 h. A 1:3 ratio by volume of doping solution to pre-polymer was used.

Hydrogel Preparation Imbedded Conductors:

Vinyl-functionalized multi-walled carbon nanotubes (MWNTs) were synthesized from COOH-functionalized multi-walled carbon nanotubes (COOH-MWNTs, diameter: 8-15 nm, length: 10-50 um, 2.56% (w/w functional content)). Graphene oxide 915 mg/ml of water) was prepared by Hummer's oxidation of natural flake graphite. Prior to hydrogel polymerization MWNTs or graphene oxide flakes were suspended in DI-water and dispersed in an ultrasonic water bath for 30 min. The dispersed semi-conductors were then added to the dissolved monomers (mixed in the same ratio as for simple hydrogels) and APS was added as a radical initiator. Polymerization and iron doping was performed as described above.

Mössbauer Spectroscopy:

The $^{57}Fe$ Mössbauer spectra were collected on constant acceleration instruments over the temperature range of 4.2-300 K in zero or 0.045 T applied fields. Samples were prepared by adding minced hydrogel (1-5 $mm^2$ pieces) to Teflon Mössbauer cups covered with lids. Spectral simulations were generated using WMOSS (WEB Research, Edina, Minn.). Isomer shifts are reported relative to Fe metal foil at room temperature.

The room temperature Mössbauer spectrum of a sample of the $Fe^{3+}$-doped hydrogel showed one quadrupole doublet with an isomer shift of δ=0.41 mm/s and a quadrupole splitting of $\Delta E_Q$=0.53 mm/s. These Mössbauer parameters confirm the presence in the hydrogel of high-spin $Fe^{3+}$. They are also similar to Mössbauer parameters of high-spin $Fe^{3+}$ ions in oxalates (δ between 0.35 mm/s and 0.41 mm/s and $\Delta E_Q$ between 0.38 mm/s and 0.75 mm/s).

The 4.2-K Mössbauer spectrum of a similar sample of the iron-doped hydrogel that was electrochemically reduced to $Fe^{2+}$ showed a quadrupole doublet with δ=1.37 mm/s and $\Delta E_Q$=3.26 mm/s, which represents 85% of the iron in the sample. These parameters are typical of high-spin $Fe^{2+}$ and are comparable, although at the high end, of the Mössbauer parameters of $Fe^{2+}$ in oxalates. This result confirms the efficiency of the reduction protocol. A small shoulder on the right side of the left line of the $Fe^{2+}$ quadrupole doublet indicates the presence in the sample of a small amount of high-spin $Fe^{3+}$. Note: spectrum collected at low temperature to inhibit oxidation during data collection.

Mechanical Measurements:

The mechanical testing procedure, specifically developed for the case of testing thin EPEH materials, was based on an indentation testing methodology. A circular cylindrical indentation probe (diameter 6.2 mm) was fashioned to screw into the crosshead of an MTI-1K screw driven, table top load frame. A 10N Transducer Techniques load cell was employed to measure the force exerted on the EPEH specimen by the indentation probe. Owing to the thin nature of the specimens tested (<10 mm), as well as the small range of expected loading, the strain was calculated from the crosshead displacement as opposed to using an external extensometer. Additional experimental parameters such as strain rate and total strain were determined by referring to ASTM D1621-04A Standard Test Method for Compressive Properties of Rigid Cellular Plastics. Each indentation test yielded a single stress-strain curve, which contributed a single stiffness measurement (Young's modulus). In total, five indentation tests were performed on each 2.5×2.5×0.2 cm sample (one in each corner, and one in the center of the sample) and the mean value was reported. Per the standard, Young's modulus is measured by taking the slope of the linear portion of the curve.

Electrochemical Measurements.

Cyclic voltammetry (CV) and amperometry measurements were carried out with a CH Instruments Electrochemical work station Model 430A (Austin, Tex.) at RT using a three-electrode system composed of a glassy carbon plate (GCE, 25×25 mm) working electrode, a Ag/AgCl reference electrode, and a platinum grid counter electrode. The GCE was polished with 0.3 μm $Al_2O_3$ paste and cleaned thoroughly in an ultrasonic water bath for 5 min prior to each use. The CV and amperometry experiments for reduction and oxidation were carried out in 15 mL of 2.0 M $FeCl_2$/0.25 M citric acid, pH~1.8. CV data were acquired at a scan rate of 100 mV/s over a voltage range of 1.2 to −0.8 V. Bulk electrolysis was performed in the same electrolyte solution for up to 40 h (reduction potential −0.8 V, oxidation potential +1.2 V). All electrochemical experiments were performed under an $N_2$ atmosphere with careful exclusion of ambient light to prevent the photoreduction of $Fe^{3+}$ ions in the presence of citric acid.

Control Experiments

Bulk electrochemical reduction at −0.8 V of $Fe^{3+}$-hydrogel in 15 mL of $KNO_3$ (0.2 M, adjusted to pH 1) electrolyte was performed for 16 h. Sample exhibited properties analogous to reductions performed under standard conditions (15 mL of 2 M $FeCl_2$/0.25 M citric acid, pH~1.8, 16-20 h).

$Fe^{3+}$-hydrogel samples showed negligible leaching of $Fe^{3+}$ when soaked in 15 mL of $KNO_3$ (0.2 M, adjusted to pH 1) over similar time periods without applied reduction potential. $Fe^{2+}$-samples showed dramatic leaching into the electrolyte under similar conditions.

$Fe^{3+}$-hydrogel samples showed negligible exchange when soaked in 15 mL of 2 M $FeCl_2$/0.25 M citric acid, pH~1.8. The material retained both color and stiffness over periods>20 h.

A $Fe^{2+}$-doped sample was treated with 2M APS by a combination of submersion (<1 hour) and intra-gel injection. The sample rapidly became dark-orange in color, smaller in dimension and qualitatively stiffer.

A $Fe^{2+}$-doped sample was exposed to atmospheric conditions in a closed container under moisture conditions (reservoir of free water, covered with damp towel) known to prevent sample dehydration. The sample became progressively orange in color and stiffer over a period of hours. Consistent with increased $Fe^{3+}$ crosslinking, some water loss from the gel occurs during this period, as indicated by sample shrinkage.

Chronoamperometry and Chronocoulometry for Redox Cycling of $Fe^{3+}$ Hydrogel

The sample used for the redox cycling was initially doped for 47 h to yield an ~2 mm thick $Fe^{3+}$ hydrogel. Redox cycles following the first reduction were carried out for 15-18 h.

Quantification of Iron:

Iron-doped hydrogels were digested for 2 h using concentrated HCl (5 mL HCl per 1 mL pre-polymer volume). Two 100 μL aliquots from the HCl-degraded hydrogel were diluted in parallel in sodium acetate buffer (0.1 M, pH=4) so that the absorbance was in the linear range of the instrument (10 mL final volume, denoted Samples A and B). To determine the $Fe^{2+}$ content, a solution of 1,10-phenanthroline in water (2 mL, 0.0055 M) was added to Sample A and the absorbance was measured. To determine the total Fe content, Sample B was treated with an excess of the chemical reductant hydroxylamine.HCl (1.5 mL, 1.4 M in water). After reacting for 10 min a solution of 1,10-phenanthroline (2 mL, 0.0055 M) was added and the absorbance was measured. $Fe^{3+}$ was determined by difference.

Mechanical Properties:

Mechanical measurements and quantitative analysis were carried out on $Fe^{2+}$- and $Fe^{3+}$-doped EPEHs (ca. 2.5×2.5×0.3 mm after doping). The results are summarized in Table 1. The $FeCl_2$- and $FeCl_3$-doped hydrogels contained approximately the same amounts of total iron. When the parallel samples were mechanically tested an ~36-fold difference was observed between their moduli. The iron to carboxylate ratio was calculated assuming complete SA copolymerization (4 mL pre-polymer). It is important to note that the only difference between these samples is the oxidation state of the iron.

TABLE 1

Mechanical properties of $Fe^{2+}$- and $Fe^{3+}$-doped hydrogels.[a]

| Dopant | $Fe^{2+}$ (mmoles) | $Fe^{3+}$ (mmoles) | Young's Modulus (MPa) | Fe:carboxylate |
|---|---|---|---|---|
| $FeCl_2$ | 2.116 | — | 0.06 | 1:2.6 |
| $FeCl_3$ | — | 2.210[b] | 2.1 | 1:2.5 |

[a]Sample size ca. 2.5 × 2.5 × 0.3 mm = 1.875 $cm^3$;
[b]$Fe^{3+}$ per volume of 1.2 mmol/$cm^3$.

Cupric Doped Hydrogels and Cuprous Doped Hydrogels:

Hydrogels were prepared in a one-pot reaction to be 40% ligand (4-vinylpyridine) by mass. These samples were clear, light yellow in color, and pliable but somewhat brittle and easily cracked. These hydrogels were then doped with either copper(II) or copper(I). Doping with Copper (II) was accomplished by diffusion. The original hydrogels were soaked in a doping solution overnight containing both $CuCl_2$ and urea, a moderate chelating agent. To optimize the concentration of $CuCl_2$ and urea, an array of samples doped with different concentrations of both $CuCl_2$ and urea were tested. Variation of urea concentration in the doping solution had no noticeable effect on the mechanical properties of the samples. However, variation of the copper concentration had a profound effect on the doped samples. Samples doped with 2.0 M $CuCl_2$ were deep green, soft, and pliable. Samples doped with 1.0 M $CuCl_2$ were turquoise, somewhat harder than the 2.0 M samples, yet still pliable. Samples doped with 0.5 M $CuCl_2$ were bright sky blue, glassy, and hard. Samples also shrank considerably in size after doping. Samples were tough and robust, but could be bent if enough force was applied.

Larger samples doped with 0.5 M $CuCl_2$ and 0.025 M urea were prepared. These larger samples were suitable for tensile testing, and were tested for mechanical strength. The average Young's Modulus of these materials in the second non-zero elastic modulus state was 48.3 MPa, with a standard deviation of 2.4 MPa.

The original hydrogel samples could also be doped using copper(I). The samples were doped by soaking overnight in a doping solution containing CuCl, $NH_4OH$, a complexing agent, and sodium meta-bisulfite, a reducing agent. The hydrogels that were doped with CuCl remained clear and pale yellow. Samples did not appear to shrink or swell as a result of doping. However, the samples oxidized readily in air to copper (II) as a result of the presence of oxygen. Oxidation in air resulted in a color transition from yellow to green, and then to the characteristic bright blue of a copper (II) hydrogel. The sample became harder, smaller, and small beads of water became evident on the outside of the sample.

An array of hydrogels were prepared to be 20, 25, 30, and 35% 4-vinylpyridine by mass. Increasing the amount of ligand in the hydrogels resulted in a darker yellow color and an increase in brittleness. These samples were then doped with decreasing concentrations of $CuCl_2$ and a constant concentration of urea (0.025 M). After the samples were doped with $CuCl_2$, those containing greater amounts of ligand were a darker blue and stiffer than those with less ligand.

Copper(II)-doped samples could be converted to copper (I) electrochemically. To facilitate the experiment, the original hydrogel was prepared on top of a glassy carbon electrode. The sample was doped without removal from the electrode overnight in 0.5 M $CuCl_2$ and 0.025 M urea. Electrochemical reduction of the sample was conducted in 15 mL of an electrolyte that was also 0.5 M $CuCl_2$ and 0.025 M urea. The sample was initially hard, glassy, and bright blue. The electrolyte solution was initially bright blue. After reduction overnight at −0.2 V, the electrolyte turned a pale blue-green and large masses of copper metal were found to have precipitated around the sample. The sample itself became much softer and turned a clear, very light sea green dotted with elemental copper particles. By adjusting the composition of the electrolyte, it is possible to completely suppress Cu(0) formation.

Figure 3:
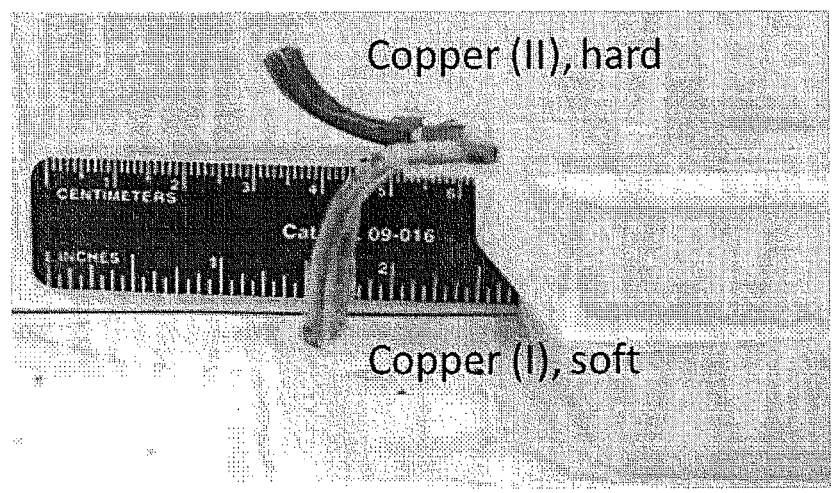
FIG. 3: A $Cu^{2+}$-coordinated sample is stiff, whereas the colorless $Cu^+$-coordinated sample is soft and bends in response to gravity.

A pressure dependent rate of reduction has been observed when the sample is compressed during the electrochemical transformation. The iron-based hydrogels also exhibit this behavior. FIG. 3. Copper(I)-based gels can also be converted by electrochemical oxidation to $Cu^{2+}$. The oxidized samples are blue in color and stiffer as expected.

Typical Hydrogel Preparation for Copper EPEHs:

Sodium (4-styrene sulfonate) (SS, 1.6 g, 7.77 mmol), 4-vinylpyridine (VP, 0.41 mL, 3.80 mmol), and poly(ethylene glycol) diacrylate, (PEG-DA, $M_n$=575, 100 µL, 0.194 mmol) were combined with 9 mL of deionized water and gently heated to below 40° C. until all solids were dissolved. The mixture was purged with $N_2$ for 1 min. Ammonium persulfate (APS, 60 mg, 2.2 mol %) was added as radical initiator for copolymerization. Depending on the dimensions of the sample being prepared, 2 to 3 mL of the reaction mixture was pipetted into a mold. For electrochemical experiments the mold for the sample was created by temporarily affixing a square glass cell using poly(dimethylsiloxane) adhesive to a Teflon base bearing a freshly polished glassy carbon electrode (GCE). The mold/sample combination was then heated at 85° C. for 1.5 h.

Doping of PSS/PVP Thin Samples with $Cu^{2+}$:

The doping solution was prepared to be 0.5 M in $CuCl_2$ and 0.025 M in urea. Samples were doped with 5 mL copper solution for every 2 mL hydrogel solution. For a typical doping solution, $CuCl_2$ (0.34 g, 2.5 mmol) and urea (0.008 g, 0.13 mmol) were combined with 5 mL deionized water and stirred until all solids were dissolved. The doping solution was poured directly over the sample. Both sample and solution were covered and allowed to sit overnight.

Doping of PSS/PVP Thin Samples with $Cu^+$:

The doping solution was prepared to be 0.1 M in CuCl, 0.5 M in $NH_4OH$, and 0.25 M in sodium meta-bisulfite. Samples were doped with 5 mL copper solution for every 2 mL hydrogel solution. For a typical doping solution, CuCl (0.05 g, 0.51 mmol), sodium meta-bisulfite (Baker, 0.25 g, 1.3 mmol), and $NH_4OH$ (Baker, 0.14 mL, 2.4 mmol) were combined with 5 mL deionized water that had been purged with $N_2$ for 5 min. The mixture was stirred until all solids were dissolved. The solution was purged for another minute, and poured over the sample. Both sample and solution were covered and allowed to sit overnight under $N_2$.

It should be understood that while this invention has been described herein in terms of specific embodiments set forth in detail, such embodiments are presented by way of illustration of the general principles of the invention, and the invention is not necessarily limited thereto. Certain modifications and variations in any given material, process step

TABLE 2

The results of an indentation test for the first eight samples depicted in E represents the average Young's modulus, and σ represents the standard deviation of the measurements.

| Sample | a | b | c | d | e | f | g | h |
|---|---|---|---|---|---|---|---|---|
| [$CuCl_2$] | 0.25M | 0.25M | 0.25M | 0.25M | 0.1M | 0.1M | 0.1M | 0.1M |
| % ligand | 20 | 25 | 30 | 35 | 20 | 25 | 30 | 35 |
| E | 3.9 MPa | 931 kPa | 2.66 MPa | N/A | 3.0 MPa | 7.4 MPa | 3.4 MPa | 1.1 MPa |
| σ | 120 kPa | 83 kPa | 160 kPa | n/a | 540 kPa | 340 kPa | 90 kPa | 10 kPa |

We claim:

1. A material reversibly cyclable between a first non-zero elastic modulus and a second non-zero elastic modulus comprising one or more metal ions and a polymer having both crosslinks that do not depend on metal binding and functional groups that have oxidation-state specific binding constants to the metal ions, wherein the polymer further comprises a least one conductive additive selected from the group consisting of: carbon nanotubes, chemically modified carbon nanotubes, graphene, partially-reduced graphene oxide, chemically modified graphene, conducting polymers and nanoparticles.

2. The material of claim 1 wherein the first non-zero elastic modulus is capable of reversibly changing to a second non-zero elastic modulus in response to changes in metal ion binding due to redox reactions occurring in the material.

3. The material of claim 2 wherein the redox reaction is caused by an electric potential applied across the material or by exposing the material to an oxidant or reductant.

4. The material of claim 2 wherein the first non-zero elastic modulus or second non-zero elastic modulus is maintained by the material after abatement of the redox reaction.

5. The material of claim 2 wherein the material, in-whole or in-part, may reversibly change from substantially the first non-zero elastic modulus to substantially the second non-zero elastic modulus and vice versa upon successive redox reactions occurring in the material, in-whole or in-part.

6. The material of claim 2 wherein the material has a minimum elastic modulus and a maximum elastic modulus, wherein each of the first non-zero elastic modulus and the second nonzero elastic modulus may consist of a value at the minimum elastic modulus, the maximum elastic modulus or a value therebetween wherein the first non-zero elastic modulus is greater than the second non-zero elastic modulus or the first non-zero elastic modulus is less than the second non-zero elastic modulus.

7. The material of claim 2 wherein the material defines a first shape while the material has the first non-zero elastic modulus which is less than the second non-zero elastic modulus, wherein the first shape may be deformed to define a second shape and wherein the second shape is maintained after application to the material of a redox reaction and wherein the material attains the second non-zero elastic modulus.

8. The material of claim 2 wherein the material is a component of a composite structure.

* * * * *